3,174,987
ORGANO- OXYMETHYL- AND ORGANO-AMINO-METHYL-SUBSTITUTED SILOXANES

Walter Simmler, Cologne-Mulheim, and Hans-Werner Kauczor, Cologne, Germany, assignors to Farbenfabriken Bayer Aktiengesellschaft, Leverkusen, Germany, a corporation of Germany
No Drawing. Filed June 27, 1962, Ser. No. 205,558
Claims priority, application Germany, June 27, 1961,
F 34,282
2 Claims. (Cl. 260—448.2)

The invention is concerned with organo-polysiloxanes of the general formula $R_nSiO_{4-n/2}$, wherein $n$ is a number between 1 and 3 and R means organic radicals of which at least one is a (polyamino)-methyl radical and at least one is an organo-oxymethyl radical of the general formula $R'OCH_2—$, while all the other radicals R are monovalent hydrocarbon radicals, preferably methyl or phenyl. R'O means a polyglycol ether radical, which can be a hydroxypolyalkylene-oxide or an alkoxypolyalkylene-oxide chain.

Such organo-polysiloxanes, which thus contain not only organo-oxymethyl substituted siloxane units but also organo-aminomethyl substituted siloxane units in the same polysiloxane molecule, are, according to the invention, produced by first reacting a hydrocarbo-(bromomethyl)-polysiloxane of the general formula $R''SiO_{4-n/2}$, in which $n$ means a number between 1 and 3 and R'' means organic radicals, of which at least two are bromomethyl radicals and the others are monovalent hydrocarbon radicals, preferably methyl or phenyl, with a polyglycol ether and a tertiary nitrogen base at a temperature above 50° C. in such a manner that for each gram atom of bromine less than one gram equivalent of OH groups in the form of polyglycol ether is used and the course of the reaction is so controlled that, at any time, the amount of nitrogen base added to the bromine compound in the reaction mixture is, at most, equivalent to the amount of hydroxyl compound already previously added to the bromine compound. It is advantageous to carry out the reaction in the presence of an inert solvent; o-xylene in a proportion between 1:2 and 1:1 by weight of the reaction components has proved to be useful.

The first step proceeds, for example, according to the equation:

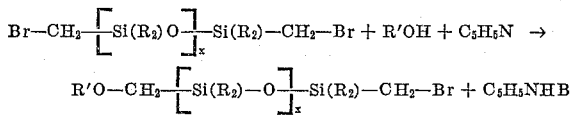

The so-obtained etherification product, after filtering off the precipitated bromine salt, is reacted in a second step, preferably at room temperature, with a polyamine, whereby at least two mols of the polyamine are used for each gram atom of bromine remaining in the etherification product of the first process step. The polyamines are preferably those of the general formula:

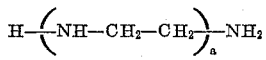

wherein $a$ means a whole number, for example 1,2 or 5.
This second step proceeds according to the equation:

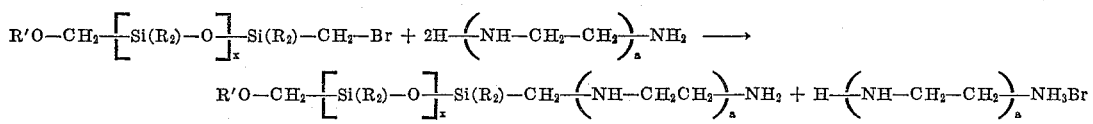

The hydrocarbo-(bromomethyl)-polysiloxanes used preferably consist of a preponderant proportion of $R_2SiO$ units; in addition, they may contain $R_3SiO_{1/2}$ units and $RSiO_{3/2}$ units. Depending on the choice of this constitution, there are obtained oils in a wide viscosity range, i.e. from mean viscosity up to gum-like products.

According to a preferred embodiment of carrying out the process of the invention, there are obtained water-soluble oils. For this purpose, there is used as polyglycol ether R'OH a copolymer of alkylene oxides with a molecular weight between 500 and 2500, of which a proportion by weight between 0 and 60% is propylene oxide, a proportion by weight between 0 and 30% is tetrahydrofuran and the remaining portion is ethylene oxide, or a lower monoalkyl ether of such a copolymer, the quantity thereof being calculated so that it amounts to between 40 and 70 percent by weight of the end product. The quantity of the polyamine should thereby be between 3 and 20 percent by weight of the end product.

The hydrolysis-resistant organo-polysiloxanes produced according to the invention possess many valuable properties: due to the polyamine chain they inhibit corrosion while, because of their polyalkylene oxide chain, they also show an outstanding lubricating effect, even in aqueous media. Therefore, they are especially suitable in aqueous emulsion or solution as lubricants in metal working, as drilling and cutting oils, since their use renders unnecessary the immediate freeing from water and greasing of the fresh metal surfaces for protection against corrosion.

The following examples are given for the purpose of illustrating the invention.

Example 1

A mixture of 200 cc. of o-xylene, 250 g. of an 8.8% by weight bromine-containing phenylmethyl-(bromomethyl)-polysiloxane of the constitution:

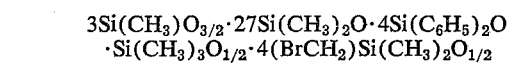

and 143 g. of the mono-n-butyl ether of a polyalkylene glycol composed of equal parts by weight of ethylene oxide and propylene oxide with an OH number of 35.7 is heated to boiling under reflux and 7.3 cc. of pyridine are added thereto uniformly over two hours. The reaction mixture is boiled for a further three hours, the precipitated pyridinium bromide filtered off and 38.4 g. of diethylene triamine are stirred into the filtrate at room temperature uniformly over three hours. The thereby precipitated bromine salt of the amine is filtered off and the filtrate freed from o-xylene by distillation. There remains a methyl-, phenyl-, n-butoxypolyethoxypropoxymethyl- and aminoethyl-aminoethyl-aminomethyl-substituted polysiloxane as a water-soluble, highly viscous oil.

Example 2

A water-soluble oil similar to that according to Example 1 of the same qualitative constitution is obtained if the process of Example 1 is repeated with the difference that there are used 250 g. of the siloxane, 288 g. of the polyglycol monobutyl ether, 400 cc. of xylene, 14.6 g. of pyridine and 19.2 g. of diethylene triamine.

Example 3

250 g. of an 11.8% by weight bromine-containing methyl-(bromomethyl)-polysiloxane of the constitution:

$Si(CH_3)O_{3/2} \cdot 20Si(CH_3)_2O \cdot 3(BrCH)_2Si(CH_3)_2O_{1/2}$ 288 g. of the same polyglycol monobutyl ether as used in Example 1, 14.5 g. of pyridine and 36.3 g. of diethylene triamine are reacted in a manner analogous to that of Examples 1 and 2. There is obtained a methyl-, n-butoxy-polypropoxy-methyl- and aminoethyl-aminoethyl-aminomethyl-substituted polysiloxane, likewise as a highly viscous, water-soluble oil.

Examples 4 and 5

Water-soluble oils similar to those of Example 3 are obtained when the process of Example 3 is repeated with the difference that, instead of diethylene triamine, there are used 82.7 g. of penta-ethylene hexamine or 21.8 g. of ethylene diamine.

Example 6

250 g. of the same methyl-(bromomethyl)-polysiloxane as used in Example 3, 510 g. of a polyalkylene glycol with an OH number of 33, obtained by copolymerisation of ethylene oxide and tetrahydrofuran in the molar ratio of 1:4, 400 cc. of o-xylene, 24 g. of pyridine and 15 g. of diethylene triamine are reacted in a manner analogous to the preceding examples. The oil thus obtained is also water-soluble.

We claim:
1. Lubricating and corrosion-inhibiting, amino group-containing carbo-functional organo-polysiloxanes having the general formula $R_nSiO_{4-n/2}$ wherein $n$ is a number between 1 and 3 and R designates organic radicals of which at least one is a (polyamino)-methyl radical having the formula

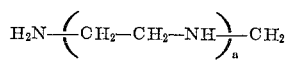

wherein $a$ is an integer of from 1 to 5 and at least one is an organo-oxymethyl radical having the formula $R'OCH_2-$, while all of the other radicals R are monovalent hydrocarbon radicals selected from the group consisting of methyl and phenyl, wherein R'O designates a polyalkylene oxide chain selected from the group consisting of hydroxy polyalkylene oxides and alkoxy polyalkylene oxides.

2. Water-soluble, lubricating and corrosion-inhibiting amino group-containing carbo-functional organo-polysiloxanes of the general formula $R_nSiO_{4-n/2}$, wherein $n$ is a number between 1 and 3 and R signifies organic radicals of which one portion is a (polyamino)-methyl radical of the formula

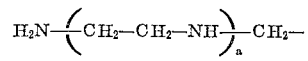

accounting for 3 to 20 percent of siloxane weight, wherein $a$ signifies a whole number of 1 to 5, and one portion is an organo-oxymethyl radical of the general formula $R'OCH_2-$, accounting for 40 to 70 percent of the siloxane weight, while all the other radicals R are methyl radicals, wherein R'O designates a polyglycol ether radical, which is composed of 0 to 60 percent by weight of propylene oxide, of 0 to 30 percent by weight of tetramethylene oxide and the remainder of ethylene oxide, the molecular weight of which is between 500 and 2500.

References Cited in the file of this patent

UNITED STATES PATENTS

| 2,846,458 | Haluska | Aug. 5, 1958 |
| 3,033,815 | Pike et al. | May 8, 1962 |

FOREIGN PATENTS

| 1,230,820 | France | Apr. 4, 1960 |